United States Patent
Walker

(10) Patent No.: US 9,873,936 B2
(45) Date of Patent: Jan. 23, 2018

(54) SUPERALLOY COMPONENT AND SLURRY COMPOSITION

(71) Applicant: SIEMENS AKTIENGESELLSCHAFT, München (DE)

(72) Inventor: Paul Mathew Walker, Dunholme (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 334 days.

(21) Appl. No.: 14/737,945

(22) Filed: Jun. 12, 2015

(65) Prior Publication Data

US 2015/0361545 A1    Dec. 17, 2015

Related U.S. Application Data

(63) Continuation of application No. 13/263,018, filed as application No. PCT/EP2010/051922 on Feb. 16, 2010, now abandoned.

(30) Foreign Application Priority Data

Apr. 9, 2009    (EP) ..................... 09005236

(51) Int. Cl.
| | | |
|---|---|---|
| *B32B 15/00* | (2006.01) | |
| *C23C 10/00* | (2006.01) | |
| *C23C 10/60* | (2006.01) | |
| *B22F 1/00* | (2006.01) | |
| *C22C 19/00* | (2006.01) | |

(Continued)

(52) U.S. Cl.
CPC .......... *C23C 10/60* (2013.01); *B22F 1/0074* (2013.01); *C22C 19/00* (2013.01); *C22C 19/056* (2013.01); *C22C 21/00* (2013.01); *C22C 21/02* (2013.01); *C23C 10/02* (2013.01); *C23C 10/30* (2013.01); *C23C 10/52* (2013.01); *C23C 28/021* (2013.01); *C23C 28/023* (2013.01); *B32B 15/01* (2013.01);
(Continued)

(58) Field of Classification Search
CPC ....... B32B 15/01; B32B 15/011; B32B 15/20; B05D 2202/00

See application file for complete search history.

(56) References Cited

U.S. PATENT DOCUMENTS

| | | | |
|---|---|---|---|
| 3,720,537 A | | 3/1973 | Rigney |
| 3,741,791 A | * | 6/1973 | Maxwell ................. C23C 10/30 427/250 |

(Continued)

FOREIGN PATENT DOCUMENTS

| | | |
|---|---|---|
| CN | 1045425 A | 9/1990 |
| CN | 1693530 A | 11/2005 |

(Continued)

OTHER PUBLICATIONS

High-Temperature Oxidation-Resistant Coatings: coatings for the prevention of the oxidation of refractory metal of superalloy and graphite, Committee on Coatings of U.S National Material Advisory Boarding, Peking Science Press, August of p. 1980, p. 418, paragraph 4; 1980.

*Primary Examiner* — Rip A Lee

(57) ABSTRACT

A slurry composition for aluminizing a superalloy component is provided, wherein the slurry includes an organic binder and a solid content including at least aluminum, silicon, and at least one of hafnium or yttrium.

17 Claims, 1 Drawing Sheet

(51) Int. Cl.
*C22C 19/05* (2006.01)
*C22C 21/00* (2006.01)
*C22C 21/02* (2006.01)
*C23C 10/02* (2006.01)
*C23C 10/30* (2006.01)
*C23C 10/52* (2006.01)
*C23C 28/02* (2006.01)
*B32B 15/01* (2006.01)

(52) U.S. Cl.
CPC ............ *Y10T 428/12674* (2015.01); *Y10T 428/12736* (2015.01); *Y10T 428/12764* (2015.01)

(56) References Cited

U.S. PATENT DOCUMENTS

| | | | |
|---|---|---|---|
| 4,005,989 A * | 2/1977 | Preston | B32B 15/01 420/439 |
| 4,132,816 A | 1/1979 | Benden et al. | |
| 4,724,172 A * | 2/1988 | Mosser | C23C 22/74 106/14.12 |
| 4,933,239 A * | 6/1990 | Olson | C23C 10/02 419/30 |
| 5,514,482 A | 5/1996 | Strangman | |
| 5,547,770 A | 8/1996 | Meelu et al. | |
| 5,650,235 A * | 7/1997 | McMordie | C23C 10/26 428/610 |
| 5,763,107 A | 6/1998 | Rickerby et al. | |
| 5,807,613 A | 9/1998 | Aguero et al. | |
| 5,989,733 A * | 11/1999 | Warnes | C23C 10/02 428/652 |
| 5,993,980 A * | 11/1999 | Schmitz | C23C 4/02 416/241 B |
| 6,080,246 A | 6/2000 | Wing | |
| 6,126,758 A * | 10/2000 | Meelu | C23C 10/28 106/14.11 |
| 6,291,014 B1 | 9/2001 | Warnes et al. | |
| 6,344,282 B1 | 2/2002 | Darolia et al. | |
| 6,387,536 B1 | 5/2002 | Takagi et al. | |
| 6,413,582 B1 * | 7/2002 | Park | C23C 10/18 427/235 |
| 6,440,499 B1 * | 8/2002 | Wydra | C23C 10/30 427/295 |
| 6,585,864 B1 * | 7/2003 | Fisher | C23C 26/00 204/192.15 |
| 7,896,962 B2 * | 3/2011 | Kool | C23C 10/18 106/600 |
| 2002/0130047 A1 | 9/2002 | Allen et al. | |
| 2004/0048090 A1 * | 3/2004 | Creech | C23C 4/18 428/621 |
| 2006/0046091 A1 | 3/2006 | Madhava | |
| 2006/0127695 A1 | 6/2006 | Gleeson | |
| 2006/0222776 A1 * | 10/2006 | Madhava | C23C 2/04 427/446 |
| 2007/0298269 A1 | 12/2007 | Kool | |
| 2015/0300200 A1 * | 10/2015 | Walker | C23C 10/02 428/680 |
| 2015/0361545 A1 * | 12/2015 | Walker | B22F 1/0074 427/380 |

FOREIGN PATENT DOCUMENTS

| | | |
|---|---|---|
| EP | 0486489 A1 | 5/1992 |
| EP | 0486489 B1 | 11/1994 |
| EP | 0786017 A1 | 7/1997 |
| EP | 0786017 B1 | 3/1999 |
| EP | 1204776 A1 | 5/2002 |
| EP | 1306454 A1 | 5/2003 |
| EP | 1306456 A1 | 5/2003 |
| EP | 1319729 A1 | 6/2003 |
| EP | 1204776 B1 | 6/2004 |
| EP | 1306454 B1 | 10/2004 |
| EP | 1728881 A2 | 12/2006 |
| EP | 1820875 A2 | 8/2007 |
| JP | S5696067 A | 8/1981 |
| JP | H0344484 A | 2/1991 |
| JP | 11158602 | 6/1999 |
| JP | 2001070879 A | 3/2001 |
| JP | 2001521987 A | 11/2001 |
| JP | 2003183809 A | 7/2003 |
| RU | 2036978 C1 | 6/1995 |
| WO | WO 9967435 A1 | 12/1999 |
| WO | WO 0044949 A1 | 8/2000 |

* cited by examiner

SUPERALLOY COMPONENT AND SLURRY COMPOSITION

CROSS REFERENCE TO RELATED APPLICATIONS

This application is a continuation of U.S. application Ser. No. 13/263,018, filed Jan. 9, 2012, now abandoned, which was a US National Stage of International Application No. PCT/EP2010/051922, filed Feb. 16, 2010, which claimed the benefit of European application No 09005236.6 filed Apr. 9, 2009. This application claims the benefit of each of the above applications and each of the above applications are hereby incorporated by reference herein in their entirety.

FIELD OF INVENTION

The present invention relates to a slurry composition for aluminising a superalloy component and a superalloy component comprising an aluminide coating.

BACKGROUND OF INVENTION

Components that are exposed to hot corrosive gases, like for example gas turbine components which are exposed to the hot and corrosive combustion gas, are typically made of superalloys which offer high strength at elevated temperatures. Such superalloys are, in particular, nickel based super alloys, iron based superalloys and cobalt based superalloys.

Although superalloys show high strength at temperatures up to 1,200° C. and more they need to be protected from oxidation and/or corrosion. This protection is typically done by alumina forming coatings such as so called MCrAlY-overlay coatings, in which M stands for iron (Fe), cobalt (Co) or nickel (Ni) and Y represents yttrium (Y), hafnium (Hf) or a rare earth element. During the preparation of the overlay coating the aluminium is oxidized and forms a tightly adherent scale of alumina which protects the components from oxidation and corrosion. Such coatings, for example, are known from EP 0 486 489 B1, EP 0 786 017 B1 or EP 1 306 456 A1.

Another method of forming corrosion and/or oxidation resistant scale of alumina is the so called slurry aluminising. In a slurry aluminising process an aluminium containing slurry is coated onto the surface of the component. Then, the component is subjected to a heat treatment which leads to melting of the aluminium. The melted aluminium then reacts with the material of the component and forms an aluminide coating with a scale of alumina protecting the component from oxidation and/or corrosion. In addition to aluminium, the slurry can also contain silicon leading to an aluminide-silicide coating which shows better oxidation resistance than the aluminide coating alone. Forming aluminide coatings and aluminide-silicide coatings by a slurry process is, for example, disclosed in U.S. Pat. No. 5,547,770, U.S. Pat. No. 6,080,246, EP 1 820 875 A2, US 2007/0298269 A1 and U.S. Pat. No. 6,126,758.

SUMMARY OF INVENTION

It is an objective of the present invention to provide an advantageous slurry composition for aluminising a superalloy component, in particular a nickel (Ni) based, cobalt (Co) or iron (Fe) based superalloy component. It is a further objective of the present invention to provide an advantageous superalloy component comprising an aluminide coating.

The above objectives are solved by the features of the independent claims. The depending claims contain further developments of the invention.

An inventive slurry composition for aluminising a superalloy component comprises an organic binder, i.e. a solvent like water with binder salts, and a solid content. The solid content includes aluminium. According to the invention, the slurry composition further comprises hafnium (Hf) and/or yttrium (Y). The hafnium and/or the yttrium may either be added as powder, in form of flakes, swarfs or the like to the solid content of the slurry or in form of salts to the organic binder.

As organic binders used in the inventive slurry chromate and/or phosphate organic binders are of particular use in the context of the present invention.

It has been found that the addition of hafnium and/or yttrium to the slurry leads to an improvement in oxidation and corrosion protection provided by an aluminide coating which is formed after heat treating a superalloy component provided with the inventive slurry. An advantageous hafnium content is up to about 2.5% by weight of the slurry, preferably up to about 1% by weight of the slurry. An advantageous yttrium content is up to about 0.1% by weight of the slurry in particular up to about 0.05% (5 ppm) by weight of the slurry.

In addition to aluminium, the solid content may include silicon between 1% and 40% by weight of the total solid content. Like hafnium and/or yttrium the silicon improves the oxidation and corrosion resistance of a coated superalloy component by forming an aluminide-silicide coating rather than an aluminide coating alone.

In a further development of the inventive slurry composition the slurry comprises at most a sulphur (S) content of 5 ppm by weight of the slurry. Since sulphur is corrosive for the superalloy material the presence of sulphur in the slurry would weaken the superalloy component when the alumina scale is formed during the heat treatment of the slurry coated component. By reducing the sulphur content in the slurry as much as possible weakening of the component during the heated treatment due to sulphur can be avoided.

An inventive superalloy component comprises an aluminide coating. The coating material comprises at least one layer which comprises hafnium and/or yttrium in addition to aluminium.

It has been found that corrosion resistance and/or oxidation resistance of the aluminide coating can be improved if hafnium and/or yttrium is/are present in addition to the aluminium.

In a special embodiment of the inventive superalloy component the coating comprises at least two layers wherein the coating material of one of the layers comprises aluminium without hafnium and without yttrium. The coating material of the other layer comprises hafnium and/or yttrium. In a further development, the coating comprises at least three layers wherein the coating material of two of the layers comprises aluminium without hafnium and without yttrium. The coating material of the third layer comprises hafnium and/or yttrium in addition to aluminium. This third layer can, in particular, be sandwiched between layers without hafnium and/or yttrium. It shall be noted, however, that although layers with yttrium and/or hafnium and layers without yttrium and/or hafnium are present in the described development of the invention, the invention is not restricted to cases in which layers without hafnium and without yttrium are present. In particular, both layers or, in case of three layers, two layers or all three layers may contain hafnium and/or yttrium in the context of the present invention.

If a layer of the coating of the inventive superalloy component comprises hafnium in addition to aluminium the hafnium content is preferably up to about 3% by weight of the layer components. Such a layer can, for example, be achieved by a slurry comprising 70% binder and up to 1% hafnium by weight of the slurry.

If the layer comprises yttrium in addition to aluminium the yttrium content is preferably up to about 0.17% by weight of the layer components. Such a layer can be achieved by using a slurry comprising up to 70% organic binder and 0.05% (5 ppm) yttrium by weight of the slurry.

According to a further development of the invention, the coating material comprises at least one layer. Coating material of that at least one layer comprises silicon in addition to aluminium. The silicon content of this layer may be between 1% and 40% by weight of the layer components. Note that it is possible that all aluminium containing layers also contain silicon.

BRIEF DESCRIPTION OF THE DRAWINGS

Further features, properties and advantages of the present invention will become clear from the following description of an embodiment of the invention in conjunction with the accompanying drawings.

DETAILED DESCRIPTION OF INVENTION

Figure 1:
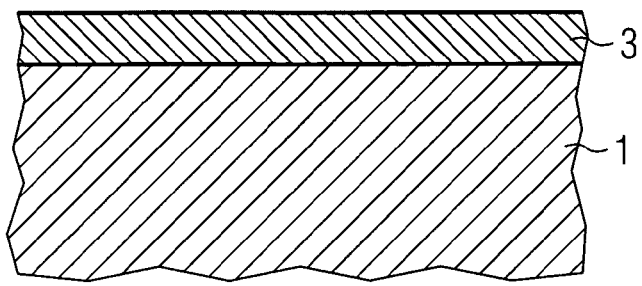
FIG. 1 shows a first embodiment of an inventive component.

A first embodiment of an inventive superalloy component is shown in FIG. 1. The Figure shows the component, which may be a gas turbine component like a turbine blade or vane, or a liner element of a hot gas flow path, in a highly schematic sectional view. The view shows the superalloy 1 with a coating 3 applied thereon. The superalloy 1 may, in particular, be one of the superalloys disclosed in EP 1 204 776 B1, EP 1 306 454 B1, EP 1 319 729 A1, WO 99/67435 A1 or WO 00/44949 A1.

Specifically according to EP 1 204 776 B1 a superalloy 1 may be made from a nickel-base superalloy, the composition of which comprises the following elements, in percent by weight: 11-13% chromium, 3-5% tungsten, 0.5-2.5% molybdenum, 3-5% aluminium, 3-5% titanium, 3-7% tantalum, 0-12% cobalt, 0-1% niobium, 0-2% hafnium, 0-1% zirconium, 0-0.05% boron, 0-0.2% carbon, 1-5% rhenium, 0-5% ruthenium, and a remainder Ni and impurities.

From EP 1 306 454 B1 a protective layer for protecting a component against corrosion and oxidation at high temperatures is known, which is composed of the following elements (details in percent by weight): 0.5 to 2% of rhenium, 15 to 21% of chromium, 9 to 11.5% of aluminium, 0.05 to 0.7% of yttrium and/or at least one equivalent metal from the group consisting of scandium and the rare earths, 0 to 1% of ruthenium, and a remainder cobalt and/or nickel and production-related impurities.

According to EP 1 319 729 A1, the superalloy 1 may be made from a nickel-base superalloy, the composition of which comprises the following elements, in percent by weight: 9-10.75% of chromium, 3-5% of tungsten, 0.5-2.5% of molybdenum, 3-5% of aluminium, 3-5% of titanium, 3-7% of tantalum, 0-12% of cobalt, 0-1% of niobium, 0-2% of hafnium, 0-1% of zirconium, 0-0.05% of boron, 0-0.2% of carbon, at least one element selected from the group consisting of, of rhenium, ruthenium, in which 1-5% rhenium, and/or 0.1 to 5% ruthenium is used, and a remainder Ni and impurities.

Nickel Aluminide coatings are also provided by the company Sermatech® International under the brand names "SermaLoy® J" and "SermaLoy® 1515". "SermaLoy® J" is a slurry applied aluminide diffusion coating designed for protection of gas turbine hot section components and industrial components suffering from hot corrosion. It is applied to the component surface, then diffused. This results in a coating that adheres tightly to the part surface. "SermaLoy® 1515" is designed to protect components made of high-strength, low-chromium nickel-base alloys extremely resistant to both high and low temperature hot corrosion, as well as oxidation. It is designed specifically to protect the inside cooling passages of turbine blades.

The coating 3 is an aluminide-silicide coating which comprises hafnium and yttrium. The hafnium content is about 3% by weight of the layer components while the yttrium content is about 0.17% by weight of the layer components.

The coating 3—corresponding to the "first layer" according to the claims—is formed by a slurry aluminising process. In this process, a solid content comprising aluminium and, optionally, silicon wherein the silicon content is between 1% and 40% of the total weight of the solid content is mixed with an organic binder comprising chromate and phosphate to form a slurry which can be applied to the surface of the superalloy 1. Hafnium powder is added to the slurry with an amount of 1% by weight of the slurry. Furthermore, yttrium powder is added to the slurry to an amount of 0.05% by weight of the slurry. When the slurry is formed the sulphur amount of the slurry is carefully controlled to a very low trace amount of less then 5 ppm.

The slurry is then applied to the surface of the superalloy component, for example by spraying it onto the receiving part. After applying it onto the surface of the component the slurry is cured by heat treatment of about 300° C. The aluminium, the optional silicon, the hafnium and the yttrium contained in the cured slurry are then diffused into the surface of the superalloy 1 by a diffusion heat treatment at temperatures between 700° C. and 1,100° C. By use of the diffusion heat treatment the aluminium, the optional silicon, the yttrium and the hafnium are incorporated into a surface layer of the superalloy 1 while the solvent of the organic binder is volatised. The remaining components of the binder that have not been volatised can be easily removed by mechanical means like, for example, by lightly blasting the surface.

Figure 2:
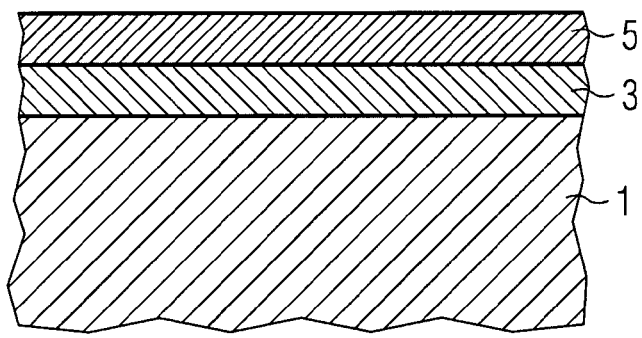
FIG. 2 shows a second embodiment of an inventive component.

A second embodiment of the inventive component is shown in FIG. 2. This embodiment differs from the first embodiment in that a second coating layer 5 is applied on the coating layer 3 of the first embodiment. Thus the coating 3 will be arranged between the superalloy 1 and the second coating layer 5. Coating layer 3 will also be called first coating layer 3 in respect to the second embodiment. The second coating layer 5 can, in principle, be a coating layer as it has been described with respect to the first coating layer 3 of the first embodiment. However, it is also possible to provide a coating layer neither containing yttrium nor hafnium as the second coating layer 5.

In a modification of the second embodiment, the first coating layer 3 only contains one of the elements hafnium and yttrium while the second coating layer contains the other one of these elements. For example, the first coating layer 3 may contain hafnium while the second coating layer 5 contains yttrium. Such layers could be produced with the process described with respect to the first embodiment for producing the coating layer 3, if only hafnium or yttrium is added to the respective slurry.

Figure 3:
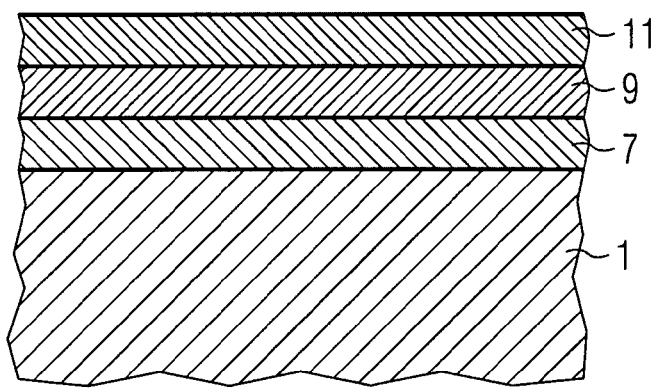
FIG. 3 shows a third embodiment of an inventive component.

A third embodiment of the inventive superalloy component is shown in FIG. 3. The coating of the third embodiment is a three layer coating with, as seen from the superalloy substrate 1, a first coating layer 7—corresponding to the "second layer" according to the claims-neither containing yttrium nor hafnium, a second coating layer 9—corresponding to the "first layer" according to the claims-containing yttrium and hafnium, and a third coating layer 11—corresponding to the "third layer" according to the claims-containing neither yttrium nor hafnium. All layers can be produced according to the process described above by just adding or not adding yttrium and/or hafnium to the respective slurry.

The embodiment shown in FIG. 3 can be modified in that either of the first coating layer 7, the second coating layer 9 and the third coating layer 11 may contain at least one of the elements hafnium and yttrium. In particular, all three layers my contain yttrium and/or hafnium. On the other hand it would be possible, for example, that the first coating layer 7 contains neither yttrium nor hafnium, the second coating layer 9 contains yttrium and the third coating layer 11 contains hafnium.

Note that for each coating layer a heat treatment or a laser treatment as mentioned above will be performed when the coating comprises more than one coating layer.

In all three embodiments the hafnium content is preferably up to about 3% by weight of the layer components and/or the yttrium content is up to about 0.17% by weight of the layer components, which can, for example, be achieved by using a slurry containing, by weight of the slurry, 70% organic binder, 1% by weight hafnium and/or 0.05% by weight yttrium, rest solid content, wherein the solid content comprises aluminium and may further comprise silicon in the range of 1% to 40% by weight of the solid content, in particular 1% to about 20% by weight of the solid content and, in special embodiments, about 10% to 15% by weight of the solid content.

I claim:

1. A slurry composition for aluminising a superalloy component comprising:
   an organic binder comprising at least one of chromate or phosphate, and
   a solid content comprising aluminum, silicon, hafnium, and yttrium.

2. The slurry composition as claimed in claim 1, wherein a content of the hafnium is less than or equal to 2.5% by weight of the slurry composition.

3. The slurry composition as claimed in claim 2, wherein the hafnium content is less than or equal to 1% by weight of the slurry composition.

4. The slurry composition as claimed in claim 1, wherein a content of the yttrium is less than or equal to 0.1% by weight of the slurry composition.

5. The slurry composition as claimed in claim 4, wherein the yttrium content is less than or equal to 0.05% by weight of the slurry composition.

6. The slurry composition as claimed in claim 1, wherein a content of the silicon is between 1% and 40% by weight of a total solid content.

7. The slurry composition as claimed in claim 6, wherein the silicon content is between 1% and 20% by weight of the total solid content.

8. The slurry composition as claimed in claim 7, wherein the silicon content is between 10% and 15% by weight of the total solid content.

9. The slurry composition as claim in claim 1, wherein a content of the organic binder is less than or equal to 70% by weight of the slurry composition.

10. The slurry composition as claimed in claim 1, wherein at least one of hafnium or yttrium is in the form of a member selected from the group consisting of powder, flakes, swarfs, and combinations thereof.

11. The slurry composition as claimed in claim 1, further comprising a sulphur content which is not more than 5 ppm of the slurry composition.

12. The slurry composition as claimed in claim 1, wherein the solid content consists of aluminum, silicon, hafnium, and yttrium.

13. The slurry composition as claimed in claim 1, wherein the solid content consists of aluminum, silicon, hafnium, yttrium, and sulphur, wherein a content of the sulphur is not more than 5 ppm by weight of the slurry composition.

14. The slurry composition as claimed in claim 1, wherein the organic binder comprises both chromate and phosphate.

15. A method for forming a coating on a substrate via one or more slurry compositions, the method comprising:
    applying a first slurry composition to the substrate, the first slurry composition comprising an organic binder comprising at least one of chromate or phosphate, and a solid content comprising aluminum, silicon, and at least one of hafnium or yttrium; and
    heating the first slurry composition to a degree effective to form a first layer comprising the aluminum, silicon, and at least one of hafnium or yttrium;
    applying a second slurry composition to the substrate, the second slurry composition comprising an organic binder comprising at least one of chromate or phosphate, and a solid content comprising aluminum and silicon, but no hafnium or yttrium; and
    heating the second slurry composition to a degree effective to form a second layer comprising aluminum and silicon and no hafnium or yttrium on the first layer.

16. The method of claim 15, wherein the first slurry composition comprises both hafnium and yttrium, and wherein a content of the silicon in the first slurry composition is between 1% and 40% by weight of a total solid content.

17. The method of claim 15, wherein the heating the first slurry composition comprises:
    heating the first slurry composition to a temperature of at least about 300° C. to cure the first slurry composition; and
    heating the first slurry composition to a temperature of from 700°-1100° C. to diffuse aluminum, silicon, and at least one of hafnium or yttrium into a surface layer of the substrate.

* * * * *